3,178,290
PHOTOGRAPHIC LAYERS SUITABLE FOR THE
    SILVER DYESTUFF BLEACHING METHOD
Walter Anderau, Munchenstein, Switzerland, assignor to
  Ciba Limited, Basel, Switzerland, a company of Switzer-
  land
No Drawing. Filed July 13, 1961, Ser. No. 116,702
Claims priority, application Switzerland, July 6, 1960,
                7,708/60
          12 Claims. (Cl. 96—99)

The silver dyestuff bleaching method for the production of photographic color images depends on the fact that numerous azo-dyestuffs with which layer-forming substances, more especially gelatine, can be colored are capable of being destroyed to an extent which depends on the amount of image silver present due to reduction of the azo linkages during treatment with a suitable dyestuff-bleaching bath.

The present invention provides photographic layers suitable for the production of color images by the silver dyestuff bleaching method which are colored with azo-dyestuffs of the formula (1) 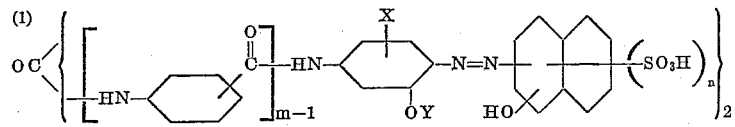

in which X represents a hydrogen or chlorine atom or an alkyl or sulfonic acid group, Y represents a hydrogen atom or an alkyl group, and $m$ and $n$ each represent the whole number 1 or 2, and in which the azo linkage and the hydroxyl group in the naphthalene radical are bound in vicinal positions, or with complex copper or nickel compounds of these azo-dyestuffs.

The benzene radical of the formula (2) 

contains in ortho-position to the azo linkage an alkoxy, preferably a methoxy group, or a hydroxyl group. X may represent a hydrogen or chlorine atom, an alkyl group such as methyl or ethyl or a sulfonic acid group.

In the naphthalene radical of the formula (3) 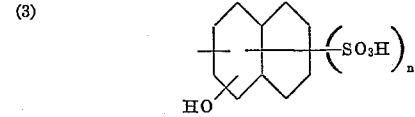

the hydroxyl group is bound in a position vicinal to the azo linkage. As further substituents the naphthalene radical contains one or two sulfonic acid groups.

The dyestuffs of the Formula 1 are advantageously made by coupling a diazo-compound of a 1-amino-4-nitrobenzene of the formula (4) 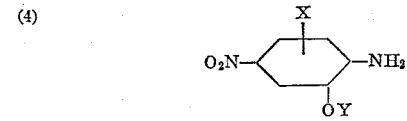

in which X and Y have the above meanings, with a monohydroxynaphthalene monosulfonic or disulfonic acid capable of coupling in a position vicinal to the hydroxyl group, reducing the resulting nitro-azo-dyestuff to the amino-azo-dyestuff, and, if desired, acylating the latter with a nitribenzoyl halide, such as meta- or preferably para-nitrobenzoyl chloride, reducing the nitro group to the amino group, and finally converting the amino-azo-dyestuff into a urea derivative by means of phosgene.

The complex copper and nickel compounds of the dyestuffs of the Formula 1 are obtained by treatment with an agent yielding copper or nickel. In this connection it is sometimes advantageous to make ortho:ortho'-dihydroxy-azo-metal complexes by subjecting ortho-hydroxy-ortho'-methoxy-azo-dyestuffs to metallization accompanied by demethylation rather than to use ortho:ortho'-dihydroxy-azo-dyestuffs. In other respects the dyestuffs and their copper and nickel complexes can be prepared in the conventional manner.

As examples of diazo-components of the Formula 4 the following amines may be mentioned:

5-nitro-2-amino-1-hydroxybenzene,
4-methyl-5-nitro-2-amino-1-hydroxybenzene,
1-amino-2-methoxy-4-nitrobenzene,
1-amino-2-methoxy-4-nitro-6-chlorobenzene, and
1-amino-2-methoxy-4-nitrobenzene-5-sulfonic acid.

For coupling with the diazo-compounds the following hydroxynaphthalene sulfonic acids may be used:

1-hydroxynaphthalene-4- or -5-sulfonic acid,
2-hydroxynaphthalene-4-, -5-, -6-, -7- or -8-sulfonic acid,
1-hydroxynaphthalene-3:6- or 3:8-disulfonic acid, or
2-hydroxynapthalene-3:6- or -6:8-disulfonic acid.

As suggested by the foregoing remarks dyestuffs of the formulae (5) 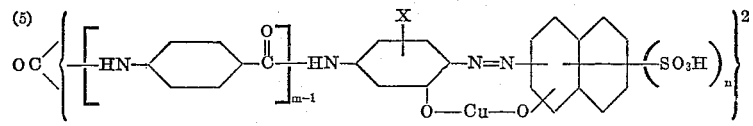

and (6)

are preferably used. In these formulae X, $m$ and $n$ have the above meanings. Certain of the dyestuffs of the Formulae 1, 5 and 6 are known.

In general it is of advantage for the layer containing the finished photographic image not to contain a metal-free dyestuff of the Formula 1, but to contain a complex heavy metal compound, preferably a complex nickel or copper compound, of such dyestuff. Such a complex metal compound may be present in the layer concerned from the outset.

The dyestuffs of the Formula 1 or their complex copper or nickel compounds are used in accordance with the invention in the production of colored photographic layers, more especially gelatine layers, but also layers of other colloids used in photography, and more especially as dyestuffs for purple images of original or copying materials used for color photography, that is to say, in color negative materials and in color diapositives for viewing by transmitted or reflected light. Thus, the layer-forming substance colored with such a dyestuff is mixed with a silver halide emulsion, the silver halide is sensitized in a suitable manner for a specific region of the spectrum, and a layer of the emulsion is used, for example, as a component of a two-color or three-color system. Alternatively, a non-colored silver halide layer may be colored after exposure and development, and then the dyestuff bleaching process is carried out. A color image obtained by the silver dyestuff bleaching process may also be used for a transfer process or for an imbibition process.

As dyestuff bleaching baths there are suitable most of the known neutral or acid, more especially strongly acid, bleaching baths that contain a solvent for silver, such as thiourea, urea or a semicarbazide, and an alkali metal halide, such as sodium or potassium chloride, bromide or iodide, or an ammonium halide. The catalysts known for use in bleaching baths for azo-dyestuffs, such as anthraquinone and its sulfonic acids or dimethylquinoxaline and also amino-hydroxyphenazines, generally also accelerate the dyestuff bleaching process.

It has been observed that layers rich in silver yield color images of an excellently flat gradation. Any image silver not required for the dyestuff bleaching process is converted into silver halide in known manner by means of an oxidizing bath in the presence of an alkali metal halide, for example, by means of potassium ferricyanide and potassium bromide or by means of an acid bath containing copper sulfate and sodium chloride. Finally, the layer is fixed in known manner in a sodium thiosulfate bath, washed and dried.

The bleaching process can be further assisted by intermediate washing with water, for example, by bleaching for 10 minutes, washing for 5 minutes, bleaching again for 10 minutes, washing for 5 minutes and then completing the bleaching. The addition of a water-soluble organic solvent such as an alcohol, acetone, dioxane, a glycol or dextrose may also assist the dyestuff bleaching process.

Instead of incorporating a metalliferous dyestuff with the photographic material initially, a metal-free dyestuff of the Formula 1 may be so incorporated and converted into the metal complex in the material containing the color image. Such a conversion takes place extensively or even completely when the known strongly acid copper sulfate solution is used as silver bleaching bath. However, complexes of other heavy metals, have a tendency to split up in a strongly acid media. In such cases, that is to say, when the layer initially contains such a complex or when the complex is formed subsequently, it is preferable not to use a strongly acid bath, and not to use a silver bleaching bath containing copper, since otherwise there may finally be present, for example, instead of the desired unitary nickel complex, a mixture of nickel and copper complexes and/or metal-free dyestuff.

The photographic images produced with the dyestuffs of the Formula 1 or complex metal compounds thereof are distinguished by their very good fastness to light, and this fastness is not impaired by diffusion-inhibiting substances such as guanidine, biguanides or triphenylguanidine present in the colored layer or in adjacent layers.

The following examples illustrate the invention.

*Example 1*

3 to 5 grams of the cupriferous dyestuff of the formula (7)

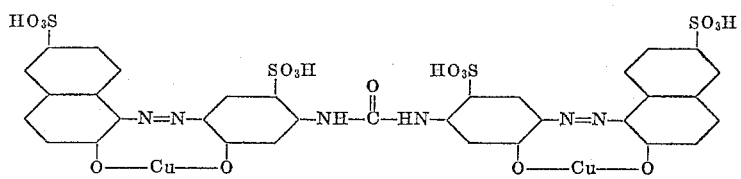

are dissolved in 600 cc. of water. (The dyestuff can be prepared by coupling diazotized 1-amino-2-methoxy-4-nitrobenzene-5-sulfonic acid with 2-hydroxy-naphthalene-6-sulfonic acid, reducing the nitro-monoazo-dyestuff to the amino-monoazo-dyestuff, linking together the amino groups to form the urea derivatives by means of phosgene, followed by demethylating coppering.) The solution is added to 1000 grams of a green-sensitized silver bromide gelatine emulsion containing 25 to 35 grams of silver. The quantities of dyestuff and silver bromide are adjusted within the aforementioned limits depending on whether the photographic images to be produced are intended for viewing by reflected or transmitted light and depending on the thickness of the layer.

The colored silver bromide gelatine emulsion is cast on the chosen support, that is to say, on paper or a film base, as a component of a three layer material. After being dried, the material is exposed, and the negative silver image is developed with a solution containing, per liter of water, 1 gram of methyl-para-amino-phenol, 3 grams of hydroquinone, 25 grams of sodium sulfite, 40 grams of sodium carbonate and 1 gram of potassium bromide. The developing time ranges from 5 to 7 minutes. The material is then washed in water for one minute and fixed for five minutes in a bath containing, per liter of water, 200 grams of sodium thiosulfate and 25 grams of potassium metabisulfite. The material is fixed for 5 minutes, then washed again in water for 5 to 7 minutes and hardened for 5 minutes in an aqueous formaldehyde solution of 4% strength. The material is again washed for 5 minutes, and then treated for 20 minutes in a silver dyestuff bleaching bath which contains, per liter of water, 50 to 100 grams of potassium bromide, 30 to 60 grams of thiourea, 40 to 80 cc. of hydrochloric acid of 37% strength and as catalyst 1 cc. of a solution of 1% strength of amino-hydroxyphenazine. The material is then washed for 5 minutes. Any unconsumed image silver is removed in a bath containing, per liter of water, 60 grams of copper sulfate, 80 grams of potassium bromide and 30 cc. of hydrochloric acid of 37% strength, which converts the silver into silver bromide, which, after washing the material for about 5 minutes, is removed by dissolution in a fixing bath containing 200 grams of sodium thiosulfate per liter of water. Finally, the material is again washed for 5 minutes and dried. A reversed image of pure purple tint is obtained which is very fast to light.

Instead of the dyestuff of the Formula 7, there may be used for purple layers the corresponding complex nickel compound or one of the cupriferous dyestuffs of the formulae:

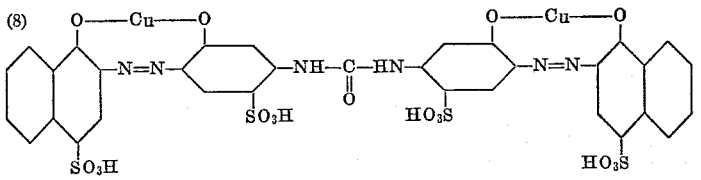

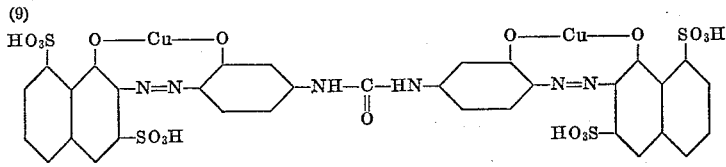

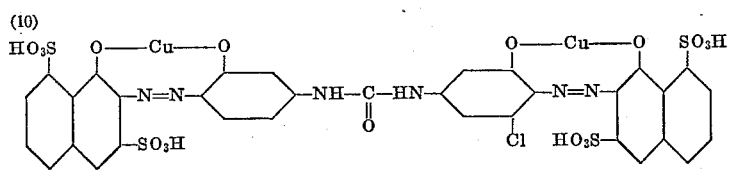

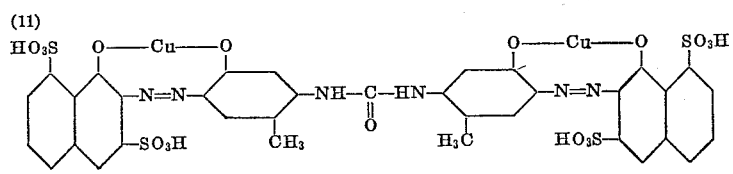

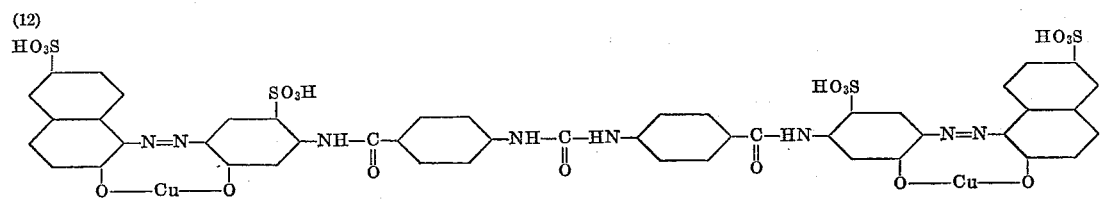

The dyestuff of the Formula 12 is distinguished by its particularly good fastness to diffusion.

*Example 2*

The procedure is the same as described in Example 1, except that the metal-free dyestuff of the formula

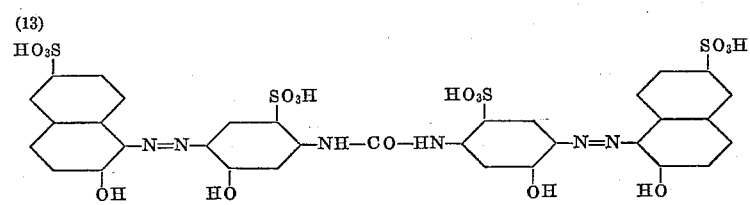

is used instead of the copper compound mentioned in that example. The same result is obtained, that is to say, the purple tint of the complex copper compound of the dye is obtained, because in the silver dyestuff bleaching bath containing copper sulfate and potassium bromide in acid solution the complex copper compound of the azo dye is formed immediately.

If it is desired to prevent this, the residual image silver must be treated with a silver bleaching bath that is free from copper ions, for example with a solution containing per liter of water, 60 grams of potassium ferricyanide, 15 grams of potassium bromide, 13 grams of secondary sodium phosphate and 6 grams of sodium sulfite. In this manner a metal-free dyestuff image is formed which has strong indicator action in that it exhibits a blue tint in alkaline media and a reddish brown tint in acid media. When the metal-free dyestuff image is after-treated with a solution of nickel sulfate or nickel acetate containing 0.5 to 2% of the nickel salt, the metal-free dyestuff is converted in a few minutes into the nickel complex which also has a purple color, but is slightly more reddish than the copper complex. This image is likewise very fast to light and no longer possesses indicator characteristics.

What is claimed is:
1. A photographic silver halide emulsion layer for the silver dyestuff bleaching process, which layer is colored with a complex copper compound of an azo-dyestuff of the formula

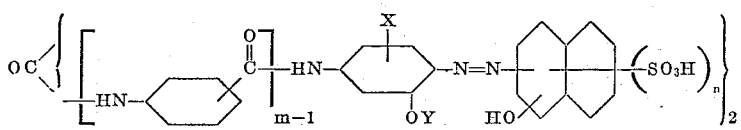

in which X represents a member selected from the group consisting of a hydrogen atom, a chlorine atom, a lower alkyl group and a sulfonic acid group, Y represents a member selected from the group consisting of a hydrogen atom and a lower alkyl group, $m$ and $n$ each represents a whole number of at the most 2, and in which the azo linkage and the hydroxyl group in the naphthalene radical are bound in vicinal positions.

2. A photographic silver halide emulsion layer for the silver dyestuff bleaching process, which layer is colored with an ortho:ortho'-dihydroxy-azo copper complex compound of the formula

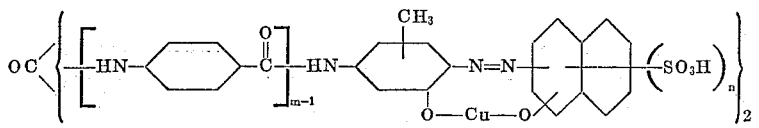

in which $m$ and $n$ each represents a whole number of at the most 2.

3. A photographic silver halide emulsion layer for the silver dyestuff bleaching process, which layer is colored with an ortho:ortho'-dihydroxy-azo copper complex compound of the formula

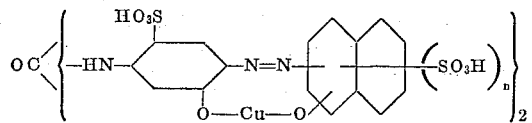

in which $m$ and $n$ each represents a whole number of at the most 2.

4. A photographic silver halide emulsion layer for the silver dyestuff bleaching process, which layer is colored with an ortho:ortho'-dihydroxy-azo copper complex compound of the formula

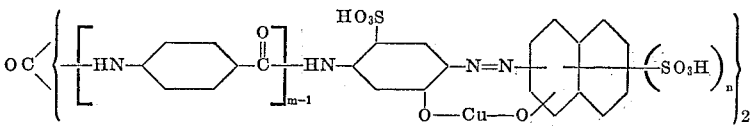

in which $m$ and $n$ each represents a whole number of at the most 2.

5. A photographic silver halide emulsion layer for the silver dyestuff bleaching process, which layer is colored with an ortho:ortho'-dihydroxy-azo copper complex compound of the formula

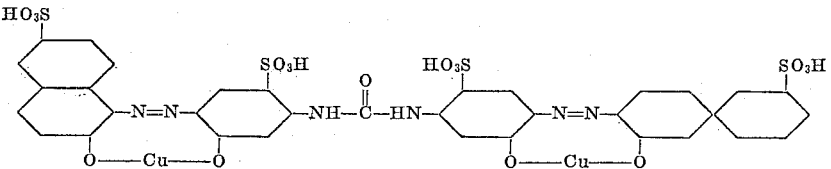

in which $m$ and $n$ each represents a whole number of at the most 2.

6. A photographic silver halide emulsion layer for the silver dyestuff bleaching process, which layer is colored with an ortho:ortho'-dihydroxy-azo copper complex compound of the formula

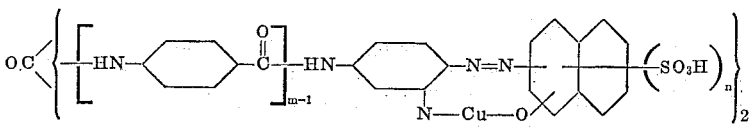

in which $n$ represents a whole number of at the most 2.

7. A photographic silver halide emulsion layer for the silver dyestuff bleaching process, which layer is colored with the ortho:ortho'-dihydroxy-azo copper complex compound of the formula

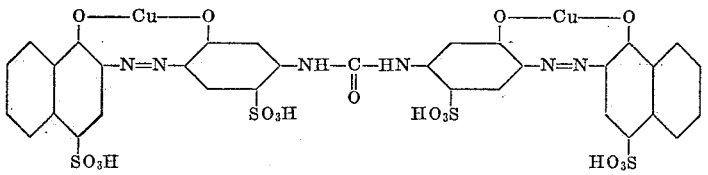

8. A photographic silver halide emulsion layer for the silver dyestuff bleaching process, which layer is colored with the ortho:ortho'-dihydroxy-azo copper complex compound of the formula

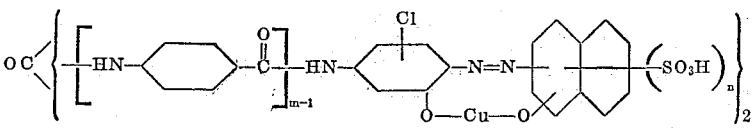

9. A photographic silver halide emulsion layer for the silver dyestuff bleaching process, which layer is colored with the ortho:ortho'-dihydroxy-azo copper complex compound of the formula

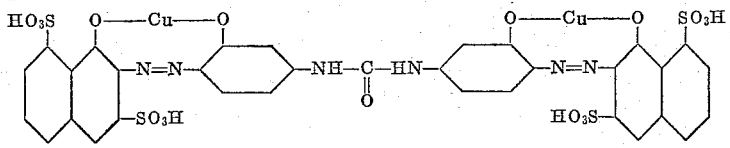

10. A photographic silver halide emulsion layer for the silver dyestuff bleaching process, which layer is colored with the ortho:ortho'-dihydroxy-azo copper complex compound of the formula

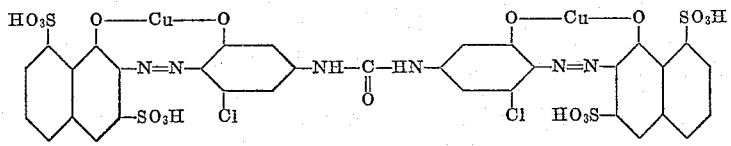

11. A photographic silver halide emulsion layer for the silver dyestuff bleaching process, which layer is colored with the ortho:ortho'-dihydroxy-azo copper complex compound of the formula

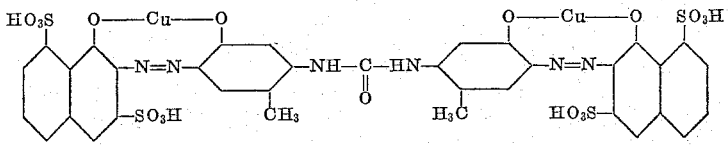

12. A photographic silver halide emulsion layer for the silver dyestuff bleaching process, which layer is colored with the ortho:ortho'-dihydroxy-azo copper complex compound of the formula

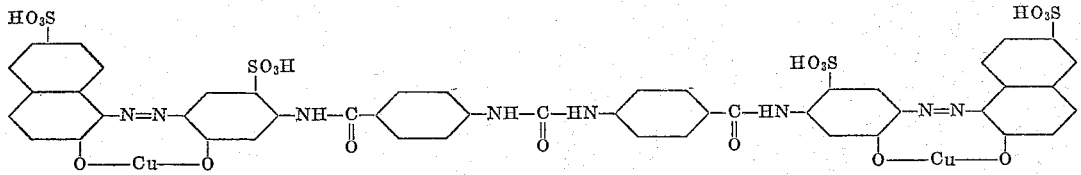

References Cited by the Examiner
UNITED STATES PATENTS

| | | | |
|---|---|---|---|
| 1,300,616 | 4/19 | Ives | 96—57 |
| 1,305,962 | 6/19 | Crabtree | 96—57 |
| 1,940,066 | 12/33 | Stusser | 260—148 |
| 2,294,892 | 12/42 | Carroll et al. | 96—99 |
| 2,304,884 | 12/42 | Carroll et al. | 96—99 |
| 2,418,624 | 4/47 | Chechak et al. | 96—99 |
| 2,612,448 | 9/52 | Gaspar et al. | 96—99 |
| 3,038,802 | 6/62 | Keller et al. | 96—73 |

OTHER REFERENCES

Color Index, Compound #23410, vol. 3, 2nd Ed., 1956, page 3203.

Venkataraman: Synthetic Dyes, vol. 1, 1952, Academic Press Inc., Publishers, N.Y., pp. 557–560.

NORMAN G. TORCHIN, *Primary Examiner.*

HAROLD N. BURSTEIN, *Examiner.*

UNITED STATES PATENT OFFICE
CERTIFICATE OF CORRECTION

Patent No. 3,178,290                      April 13, 1965

Walter Anderau

It is hereby certified that error appears in the above numbered patent requiring correction and that the said Letters Patent should read as corrected below.

Columns 7 and 8, claim 3, for that portion of the formula reading:

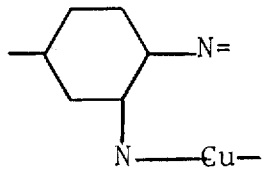     read     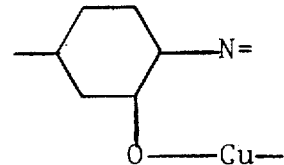

same columns 7 and 8, claim 7, for that portion of the formula reading:

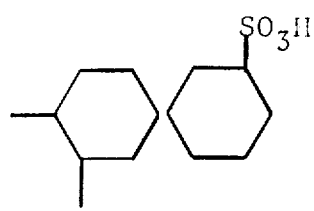     read     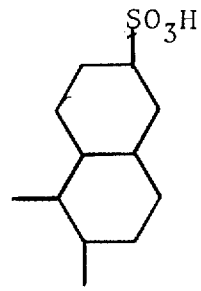

Signed and sealed this 28th day of September 1965.

(SEAL)
Attest:

ERNEST W. SWIDER                      EDWARD J. BRENNER
Attesting Officer                     Commissioner of Patents